Patented Jan. 12, 1937

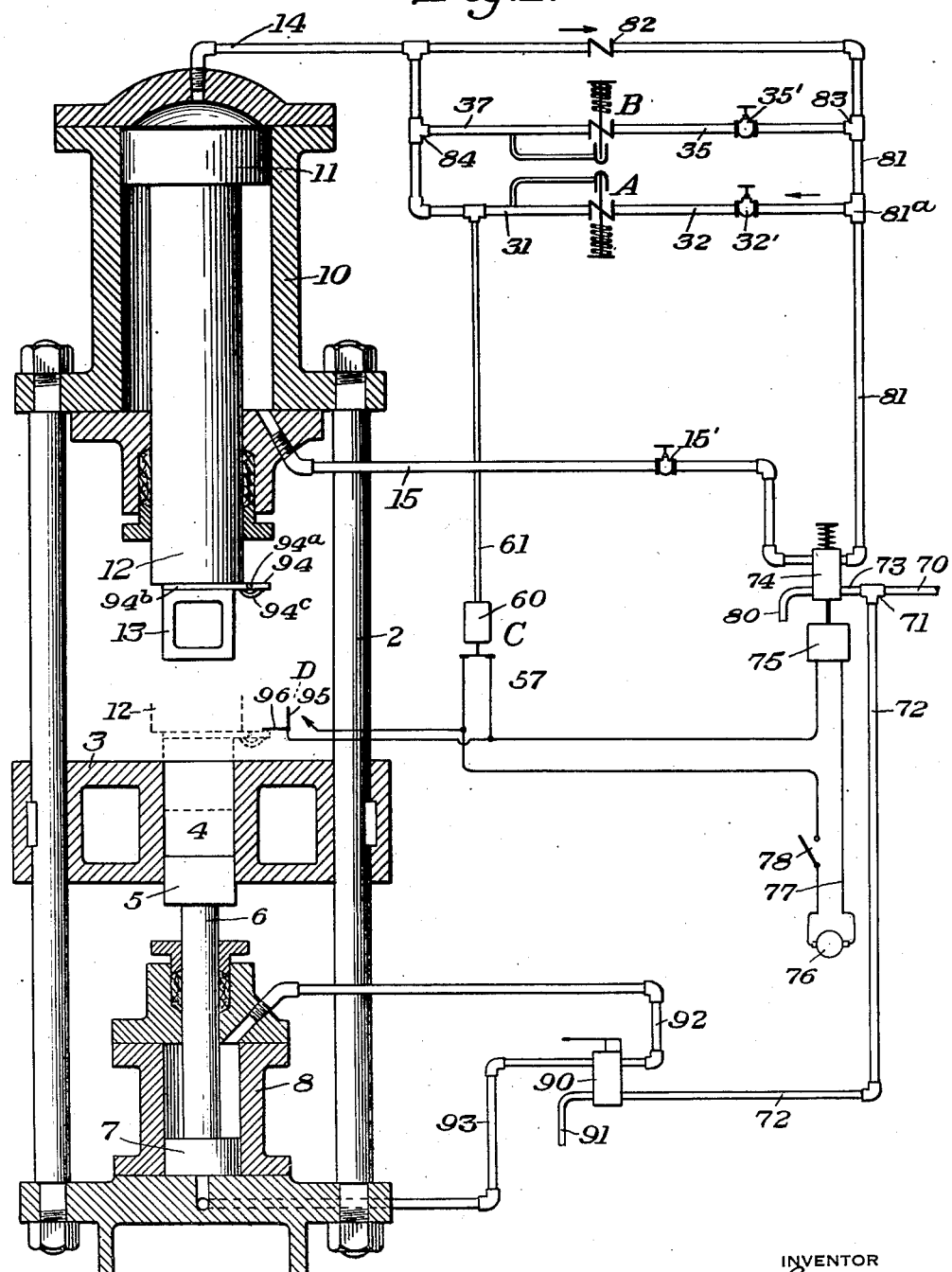

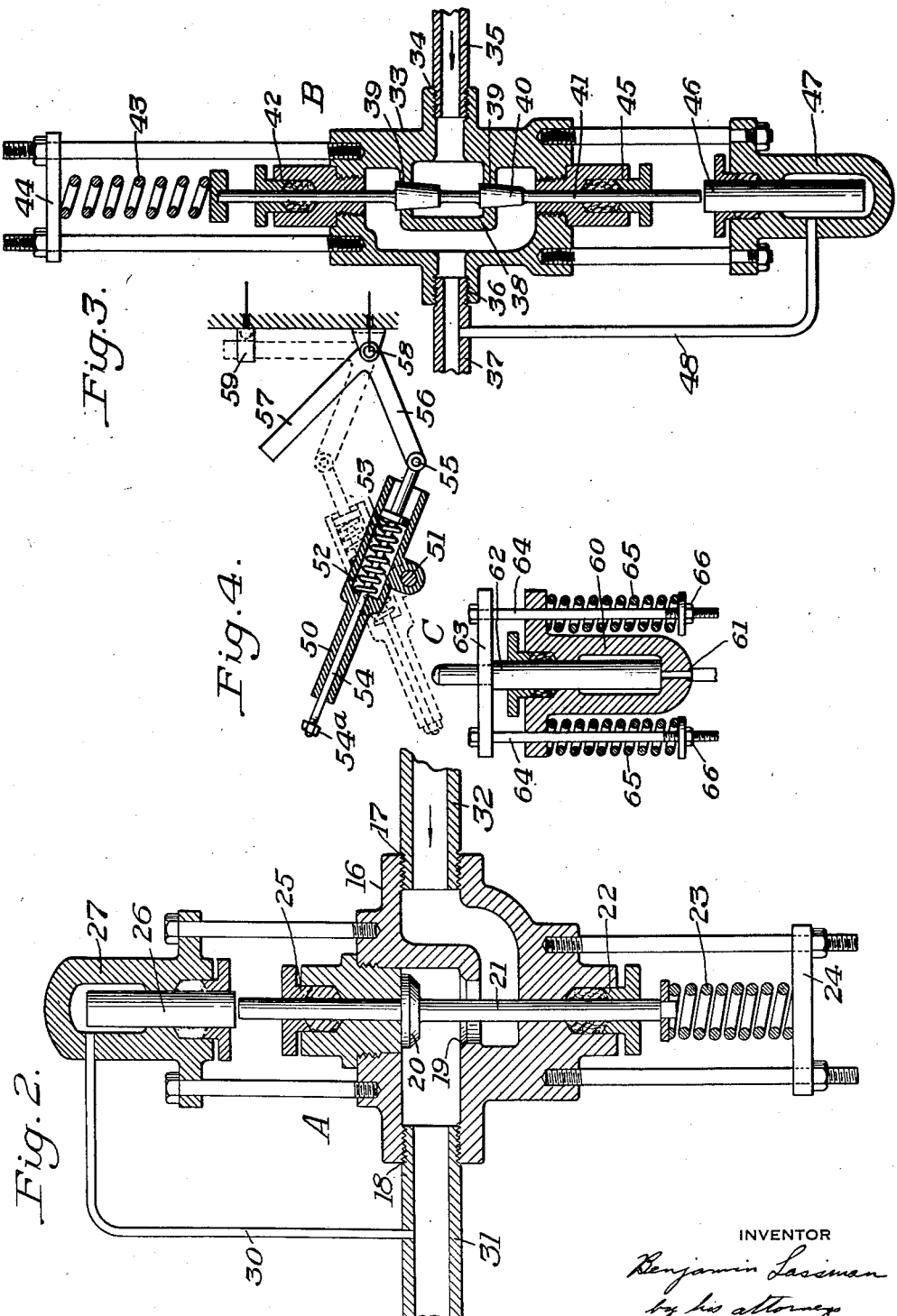

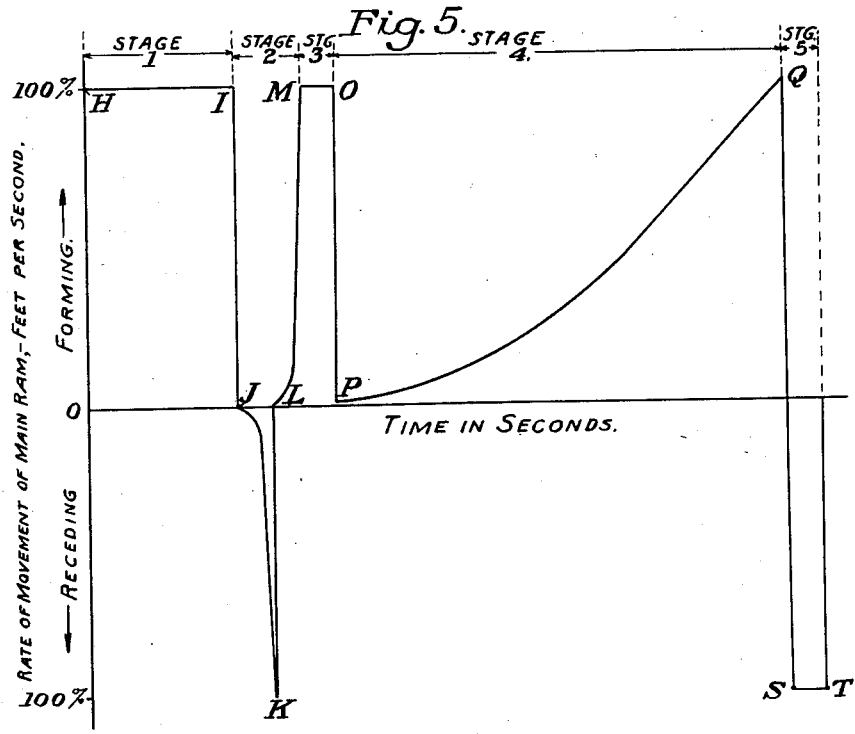
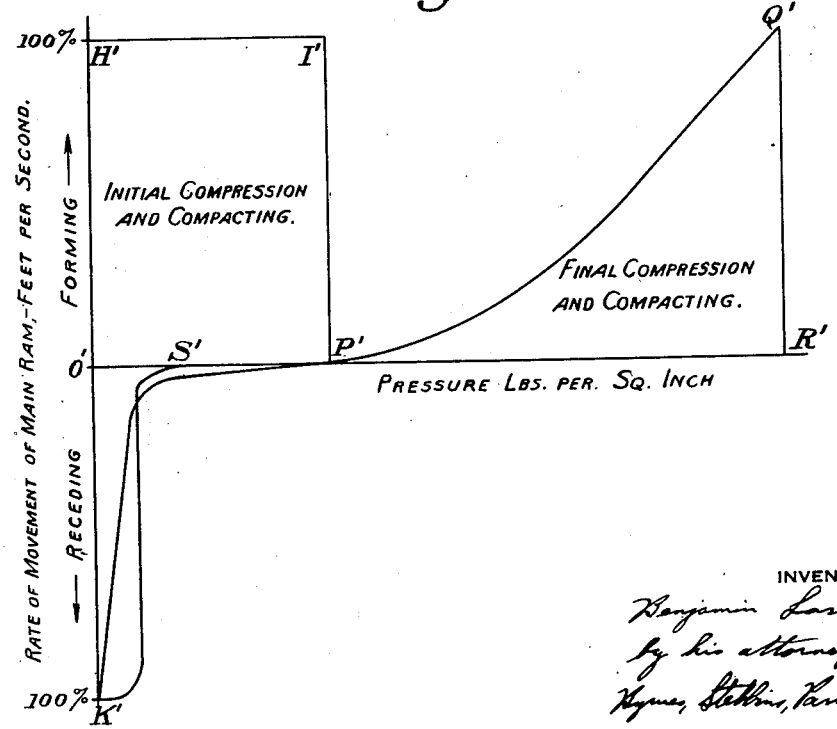

2,067,401

UNITED STATES PATENT OFFICE 2,067,401

METHOD AND APPARATUS FOR THE PRESSING OF PLASTIC AND DRY COMPOSITIONS

Benjamin Lassman, Pittsburgh, Pa., assignor to Hydraulics, Inc., Pittsburgh, Pa., a corporation of Pennsylvania Application July 28, 1932, Serial No. 625,345

25 Claims. (Cl. 25—91)

This invention relates to the forming of molded masses of plastic, semi-plastic or granular material through the use of a press. It is particularly applicable to the forming of bricks, blocks, briquettes and the like, and is applicable to the forming of such articles from any material which lends itself to granular bonding by means of applied pressure within the confining mold.

I will describe my invention with particular reference to the manufacture of dry press fire brick, but it will be understood that this is by way of illustration and not by way of limitation. The term "dry press" as used herein has been accepted by the refractory brick industry as the pressing of mixtures low in moisture content, or free of temporary binders. It was formerly believed that only plastic clays could be successfully used in dry pressing operations, but it has since been determined that clay mixtures which are highly non-plastic can be successfully employed, and even such non-plastic material as dead burned magnesite and chrome ore can be pressed without added binder.

Heretofore in the commercial manufacture of refractory brick the refractory composition has been introduced into the mold and pressed at relatively low pressures. The natural properties of the material being pressed are such that within certain pressure limits relatively slight changes in the applied pressure produce relatively wide variations in the refractory characteristics of the molded product. Above a certain limit, however, the applied pressure has relatively slight effect in further increasing the density. The pressures which have heretofore been commercially used do not take advantage of the full range in which the pressure produces wide variation.

In the manufacture of refractory bricks in dry pressing operations pressure cracking is one of the chief difficulties encountered. Pressure cracking is described as the formation of a lamination or crack within the brick due to the separation or non-bonding of some of the particles therein. It has been determined that this pressure cracking is caused by air which is entrapped in the brick by the clay particles. This air is compressed along with the clay in the mold, being unable to escape while the brick is under pressure. When the forming pressure is released and the mold is opened, the entrapped air expands to atmospheric pressure, and this expansion of the air causes a separation of the grains in the molded mass. The pressure cracks thus formed cause a poor quality of brick, increase the tendency toward spalling, and also cause the molded mass to break more easily when it is handled in its green or unfired state and also result in heavy manufacturing losses during the firing period and even after firing.

It has heretofore been proposed to overcome the effects of the entrapped air by the addition of vacuum equipment to the press by means of which air can be removed from the mold cavity during the pressing operation. The provision of such equipment is quite costly to install and to maintain, and it is uncertain in its operation due to the difficulty of maintaining such a system in proper operating condition.

It has been determined that it is not necessary to remove all of the entrapped air from the molded mass in order to overcome the effects of pressure cracking. A small amount of residual air causes no ill effects.

The present invention contemplates the pressing of articles at higher pressures than has heretofore been deemed to be commercial, and also contemplates pressing in such manner as to overcome the tendency to pressure cracking. In carrying out the present invention it is contemplated that the mass within the mold be subjected to an initial pressing operation by means of which it is compacted to a predetermined degree. The pressure is then momentarily relieved, allowing the air which has been trapped and compressed with the clay to escape. Then it is followed by a second pressing step which closes the pressure cracks which have developed by the escape of the air during the slight interval when the pressure has been relieved. The mass in the mold is therefore subjected to at least two pressing operations with an expansion period in between, and if it is desirable to repeat the cycle again so as to give the residuum of trapped air further opportunity to escape, this may be done.

The invention may be readily understood by reference to the accompanying drawings in which Figure 1 is a schematic view showing a fluid pressure press for forming bricks or the like in conjunction with a control system through which the operation of the press in accordance with a predetermined cycle is effected;

Figure 2 represents a vertical section through a spring loaded pilot operated check valve constituting a part of this control system for the press;

Figure 3 is a view similar to Figure 2 of a balanced type of pilot operated flow control valve also constituting a part of the control system;

Figure 4 is a vertical section through a type of spring toggle operated electric switch adapted to be operated manually or by fluid pressure, this device also constituting a part of the control mechanism;

Figure 5 is a diagram showing graphically the operating cycle of the press, the graph being plotted against time; and Figure 6 is a similar graph of the pressure cycle corresponding to the time cycle of Figure 5.

Referring to Figure 1, 2 designates any standard or preferred type of press having a die block 3 therein in which is a mold cavity 4 to receive the material to be pressed. The bottom of the mold cavity is closed by a block 5 carried at the end of a piston rod 6, which piston rod has a piston 7 operating within a fluid pressure cylinder 8 at the bottom of the press. The pressing is effected by means of a fluid pressure operated ram at the top of the press, this ram comprising a cylinder 10, a piston 11, a ram 12 and a die 13 at the bottom end of the ram. At the top of the cylinder 11 is a fluid inlet pipe 14 and at the bottom of the cylinder is a fluid inlet pipe 15. By the control of the flow of fluids through pipes 14 and 15 the ram may be operated to move the die 13 up and down as is well understood by those skilled in the art. So much of the press as has been described constitutes a more or less standard construction and the press per se forms no part of the present invention.

Referring now to Figure 2, this figure discloses a type of spring-loaded pilot operated check valve comprising a valve casing 16 having an inlet connection 17 and an outlet connection 18. Within the valve casing is a ported valve seat 19. The valve 20 which cooperates with this seat is carried on a reciprocable stem 21 one end of which passes through a gland 22 at the bottom of the casing and cooperates with a compression spring 23 confined between the end of the valve stem and a supporting yoke 24. The other end of the valve stem 21 projects through a gland 25 at the top of the valve casing, terminating in proximity to the lower end of a plunger 26 operating in a cylinder 27. A fluid pressure connection 30 leads from the outlet pipe 31 of the valve to the chamber of the cylinder 27.

I have designated this entire valve unit by the letter A, and it is conventionally shown in Figure 1. The manner in which the valve operates will now be described and its relation to the entire system will be hereinafter explained. Fluid flow through the valve is in the direction indicated by the arrow from a high pressure source of supply through pipe 32. The spring 23 serves to normally maintain the valve open. However, when the pressure in the pipe 31 on the discharge side of the valve builds up, the pressure is communicated through the pipe 30 to the cylinder 27, tending to force the plunger 26 down. The downward movement of the plunger 26 depresses the valve stem 21 against the pressure of the spring 23, causing the valve 20 to engage the seat 19. When the fluid pressure has forced the valve closed, the valve will remain closed so long as the pressure in the pipe 31 is sufficient to overcome the pressure of the spring 23. When the pressure within the pipe 31 is released, the spring 23 then operates to open the valve. The pressure at which the valve closes can be predetermined by proper selection of the spring 23 and by adjusting the spring, as for instance, by effecting an adjustment of the yoke 24.

Referring to Figure 3, this figure discloses a balanced type of pilot operated flow control valve, designated generally as B, comprising a casing 33 having an inlet connection 34 with an inlet pipe 35 and an outlet connection 36 with an outlet pipe 37. Inside the casing is a partition 38 having alined ports 39 therein separating the interior of the valve chamber into an inlet chamber and an outlet chamber. The flow of fluid through the ports 39 is controlled by long tapered poppets 40 carried on a common reciprocable valve stem 41. The upper end of this valve stem passes through a gland 42 at the top of the casing and is engaged by a compression spring 43, which spring is confined by an adjustable yoke 44. The lower end of the valve stem 41 passes through a gland 45 at the bottom of the valve casing and terminates in proximity to the upper end of a small plunger 46, which plunger is operated by a fluid pressure cylinder 47. A pipe 48 establishes communication between the outlet pipe 37 of this valve and the cylinder 47. This entire unit is designated B and it is diagrammatically shown in Figure 1.

The operation of this valve may now be described while its relation to the rest of the system will be hereinafter explained. Normally the spring 43 holds the valve closed by forcing the tapered poppets 40 into seating engagement with their ports 39. The spring is selected with a view to exerting the pressure required for the system in which the valve is employed, and it can be adjusted within a range by adjustment of the yoke 44.

The pressure within the outlet pipe 37 is normally less than the pressure on the inlet side of the valve. When, however, a sufficient pressure is built on the outlet side of the valve within the pipe 37, the plunger 46 will be forced upwardly, unseating the poppets 40 against the pressure of the spring 43. Because of the long taper on the poppets there will be only a slight flow of fluid through the valve for a small movement of the plunger 46. Consequently, the increase in pressure within the pipe 8 will be at a slow rate proportionate to the rate of fluid passing through the restricted valve openings around the poppets 40. As the pressure within the pipe 37 increases, there will be a corresponding increase in the movement of the plunger 10 with an increasing lift of the poppets. The valve thus provides for the progressive increase in the rate of the flow of fluid through the valve. Therefore starting with no flow of fluid through the valve when the valve is absolutely closed, the rate of flow progressively increases until the valve is opened to its maximum. The maximum opening of the valve will be obtained, of course, when the pressure in the outlet pipe 37 is equal to the pressure in the supply pipe 35.

Referring now to Figure 4, this figure discloses a type of toggle operated electric switch adapted to be closed manually and opened by a fluid presure responsive means, and which is designated generally as C. This switch comprises a handle 50 pivotally supported at 51, the handle providing a spring casing at 52 for a spring 53 which surrounds a rod 54 that is slidably passed through the handle, the arrangement of the spring being such as to resist movement of the rod 54 to the left as viewed in Figure 4. One end of the rod 54 is pivotally connected at 55 with the operating arm 56 of a switch blade 57, which blade is pivotally supported at 58, the blade 57 and its arm 56 forming in effect a bell crank arrangement. I have designated the contact with which the switch blade cooperates as 59. When the parts are in the full line position shown in Figure 4 the switch is open and the spring 53 is under relatively light pressure. By bearing down on the left-hand end of the switch handle 50 the switch may be moved to the dotted line position. The over-center movement of the switch handle 50 causes the spring 53 to be compressed so that as soon as the handle swings past the dead center position the spring will operate to snap the switch closed and yieldably hold it closed. Likewise, this toggle spring arrangement will cause the switch to snap open when the handle has been lifted from the dotted line position past the point of dead center.

For operating the switch from the closed position to the open position I have shown a fluid pressure responsive unit comprising a cylinder 60 adapted to be connected to a source of fluid pressure at 61 and having a plunger 62 therein. The outer end of this plunger terminates in proximity to the switch handle 50. The upward movement of the plunger 62 is resisted by means of a yoke 63 having rods 64 attached thereto, which rods are engaged by compression springs 65 so that these springs resist the movement of the plunger upwardly and serve to return the plunger to its normal position when the pressure falls off in the cylinder 60. The fluid pressure at which the plunger 62 will lift to operate the switch can be adjusted by adjusting the compression of the springs 55 through the provision of the adjusting nuts at 66.

The rod 54 passing through the switch handle is provided with a nut 54a adapted to engage the end of the switch handle and limit the arc of movement through which the switch handle can swing. This switch unit is designated C and it has been diagrammatically shown in Figure 1.

Referring to Figure 1, 70 designates a pipe leading from a source of high pressure fluid supply. This pipe is divided at 71, one branch being designated 72. The other branch 73 leads into a standard four-way valve unit designated 74, this valve being of standard design available on the market and familiar to those skilled in the art. It is adapted to be operated by electromagnetic means, such as a solenoid 75 chematically illustrated in the drawings. The solenoid 75 in turn is included in a circuit comprising a source of current 76 one side of which leads directly to the solenoid through wire 77. The other side of the circuit from the source of current to the solenoid preferably includes a manually operable switch at 78 and the electric switch unit C described in detail in connection with Figure 4. In parallel with the switch C is a press actuated switch D which will be hereinafter more fully described. The switch 78 may be an ordinary snap switch. The four-way valve 74, in addition to having the inlet pipe 73, has a discharge pipe 80 leading therefrom. The pipe 15 leading from the bottom of the press cylinder 10 also connects with this four-way valve. The pipe 14 leading from the top of the press cylinder 10 communicates directly with this four-way valve 74 through the pipe 81 in which there is a check valve 82, this check valve permitting the flow of fluid only in the direction of the arrow, i. e., from the pipe 14 through the check valve into the pipe 81. The pipe 81 branches at 81a, the lateral branch comprising the inlet pipe 32 for the spring loaded valve unit A of Figure 2. The discharge pipe 31 of this valve unit A communicates with the pipe 14 between the cylinder 10 and the check valve 82. The pipe 81 also has a branch at 83, and the lateral branch at this point of division is the pipe 35 on the intake side of the valve unit B described in detail in Figure 3.

The outlet pipe 37 for the valve unit B communicates with the outlet pipe 31 of the valve unit A, the two pipes being connected at 84 so that the outlet sides of both the valve units A and B communicate with the pipe 14 between the cylinder and the check valve 82.

In the pipe 31 there is a branch 61 leading to the inlet of the cylinder 60 of the pressure responsive switch unit C. The pipe 72 leading from the high pressure source 70 goes to a second standard four-way valve construction which, however, is preferably a manually operated unit and which is designated 90 in Figure 1. This valve has a discharge pipe 91 and a pressure connection 92 leading therefrom to the top of the cylinder 8 and a second pressure connection 93 leads from this valve to the bottom of the cylinder 8.

The operation of the system may now be described. At the beginning of the cycle the parts are in the position shown in Figure 1, at which time the block 5 is at its lowermost position in the mold cavity 4 and the pressing plunger 13 is elevated above the mold. At this time the mold is charged with the clay or other material to be pressed. At this time also switch D is open and the manually operated switch C is closed, as indicated in the diagram. When the switch 78 is closed, solenoid 75 is energized through the switch unit C, causing the four-way valve 74 to be operated. The operation of the four-way valve directs fluid pressure from the source 70 into the pipe 81, at the same time connecting the pipe 15 with the exhaust port 80 so that fluid on the underside of the main press or ram 10 can exhaust.

The fluid pressure cannot pass the check valve 82, and the valve unit B is normally closed, so that all of the fluid first flows through the valve unit A which is normally open into the top of the main pressing ram 10. The valve A is of course wide open so that the piston 11 will travel down at a high speed and cause the die 13 to compact the contents of the mold. The plunger has a projecting finger 94 thereon above the die 13. This lug or finger 94 is pivotally supported at 94a on an arm 94b. On its lower surface is a finger or stop 94c, the arrangement being such that the finger or lug 94 can swing upwardly from the position shown in the drawings, but cannot swing down past the horizontal position shown. The switch D comprises a pivoted blade 95 having an operating arm 96 thereon, the arrangement being a kind of a bell crank arrangement with the arm 96 in the path of travel of the finger 94 on the plunger.

When the plunger 13 has compressed the material in the mold to a predetermined extent, a counterpressure is built up in the system, closing the valve A. At the time when the pressure is sufficient to close the valve A the pressure in the system also operates the plunger 62 of the switch unit C (Fig. 4) to open the circuit through the solenoid 75. The spring on the four-way valve 74 operates the valve in the reverse direction from the solenoid 75, and the fluid pressure flows through the pipe 15 to lift the plunger, while the fluid discharges from the top of the cylinder through the pipe 14, check valve 82, pipe 81, and four-way valve 74.

In the downward movement of the plunger, the finger 94 rides over the switch arm 96 to the position shown in dotted lines in Fig. 1. When the plunger is lifted, however, the finger 94 is held rigid, and it engages the switch arm 96 to close the switch D and again energize the solenoid 75. As soon as the solenoid 75 is energized, the four-way valve is again operated to establish a fluid pressure flow from the supply pipe 70 through the pipe 81 and valve unit A to the top of the cylinder, and the plunger again starts to move down. When the pressure in the cylinder reaches the predetermined point, the valve A is again closed, and the valve B is again cracked to establish a fluid pressure flow from the source of supply through the valve B to the cylinder side of the system. Since at this time the switch C is open and the solenoid circuit is maintained through the switch D, the building up of the pressure in this second part of the cycle does not have any effect so far as the circuit to the solenoid 75 is concerned, and the pressure continues to increase in the cylinder. As the pressure increases on the cylinder side of the system, the valve B is opened wider and wider, as heretofore explained in connection with the detailed description of Fig. 3, and ultimately the full pressure from the source of supply is applied to the press. When the point of full pressure application has been reached, the switch 78 is opened to deenergize the solenoid and again operate the four-way valve to lift the ram to its normal position.

When the ram has been lifted, the valve 90 is operated to eject the formed article from the mold cavity. After the ejecting of the article the four-way valve 90 is reversed to return the parts to the normal position shown in Fig. 1, the switch unit C is re-set, and the press is ready for the cycle to be repeated.

In the initial operation of the press in the cycle which has been described, the material is compacted to the extent which is normally practiced at the present time. When the plunger is raised after the initial compacting operation, the entrapped air which has been compressed with the material being molded expands and escapes from the mold. Then with the second pressing operation pressures of considerable magnitude can be used. This second operation seals any breaks or ruptures that may have developed in the article by reason of the air under pressure escaping from the molded article. The slight reduction in volume which occurs with the second pressing operation does not compress the residual air to such an additional extent that when the pressure is relieved there will be further tendency for the air to rupture the formed article. After the first pressing operation and the escape of the air therefrom, the amount of air remaining in the article is so small as to be practically negligible. It will be seen, however, that should it be desired to use more than two steps in reaching the maximum pressure, this could be accomplished manually by the operation of the switch 78, or by the inclusion of one or more additional switch elements C arranged to open the circuit at successively higher pressures.

The pressing cycle which is effected is illustrated by the diagrams shown in Figs. 5 and 6. It is desirable, for the purpose of economy, that the cycle be completed as quickly as possible consistent with the proper forming of the brick.

When the switch 78 is closed to initiate the operation of the cycle, the valve A is wide open and the fluid from the source of supply enters the cylinder at a maximum rate. Point H on Fig. 5 designates the point of maximum plunger speed. The part of the curve marked "State 1" from points H to I indicates the time during which the valve A is open and the plunger is moved downwardly. At point I the valve A closes, the movement of the plunger is arrested, and at J the switch C is operated to deenergize the solenoid 75 and from J to K the plunger is rising. Closing of the switch D with the upward movement of the plunger arrests the upward travel, as indicated by the line KL. Upon the second operation of the valve 74 through the closing of the switch D, fluid again travels through the valve A, moving the plunger down at maximum speed. The line LM indicates the portion of the cycle in which the plunger is reaching its maximum speed at the beginning of the second pressing cycle, and from M to O the plunger is moving down. The travel of the plunger down in this third stage is indicated by the line MO and at O the valve A closes, arresting the travel of the plunger, as indicated by the line OP. At P the valve B begins to open and opens at an increasing rate. The line PQ, designated as the fourth stage in the cycle, is the period in which an increasing pressure is applied to the molded material. At Q the full pressure has been reached and movement of the plunger stops. The switch 78 is then opened, and in the fifth stage, the line ST represents the time at which the plunger is raising from the final pressing operation to begin the cycle over again.

Fig. 6 gives the pressure cycle corresponding to the time cycle shown in Fig. 5. In this figure the punch or press moves down at a rate corresponding to the line O'H'. As the material in the mold is compacted and the entrapped air compressed, fluid pressure builds up as is indicated by the line H'I'. At the point I' the valve A closes and switch C opens, causing the reversal of fluid flow through the four-way valve 74. The reversal of fluid flow first causes the press to cease moving, as indicated at point P'. The curved line P'K' represents the reverse movement of the punch following the initial pressing stage. As the plunger withdraws from the mold box, the entrapped compressed air progressively expands from the compressed material and escapes to the atmosphere. When the closing of the switch D redirects the punch 31 downward, the initial portion of the pressure cycle is repeated; that is, removal of the punch withdrawal stroke becomes zero as represented by the line K'O' and then becomes positive as indicated at O'H' and H'I'. At I' in the second part of the cycle the valve A again closes and valve B becomes operative to apply a progressively increasing pressure indicated by the line P'Q'. At Q' further movement of the plunger ceases, this being represented by the line O'R', since the maximum pressure has been reached.

The purpose of gradually completing the pressure in the second stage of the forming operation is to squeeze out such residual entrapped air as will prevent proper bonding. At point R' switch 78 is opened to reverse the four-way valve 74. The pressure in the top of the cylinder drops to zero, indicated by R', and then a negative force is applied to drive the plunger back to its initial position as indicated by the curved line S'K'.

I have previously pointed out that the valves A and B and the pressure operated switch C can be adjusted to operate at the desired pressures, first, by proper selection of the springs; and second, by the adjustment of these springs. In order to provide for further controlling and varying the cycle at any particular point, the pipes 15, 32 and 35 are provided with manually adjustable valves, indicated as 15', 32' and 35', respectively, in Figure 1. By changing the spring settings and by adjustment of the valves it is possible to alter the time pressure cycle at any point in the curve to meet the requirements of the particular material being worked and the particular article being formed. For example, a material so coarse as to permit the free escape of entrapped air or gas with the application of forming pressure will need only the initial pressing stage of the cycle for air removal, in which case the valve unit B does not need to be used for effecting a second pressing stage, and it can be rendered inoperative, as desired. As a further example, some materials may have to be subjected to a much more gradual initial pressing operation than other materials.

Since the valve A is normally fully open and permits the free flow of fluid into the cylinder until a counter-pressure has been built up, a controllable time lag can be obtained through partially closing the valve 32' so that fluid will flow into the cylinder less rapidly.

The advantages of the invention reside in a method according to which the defects inherent in present pressing systems due to the entrapping of air can be overcome through the application of one or more preliminary pressing stages followed by the final compacting stage, the method permitting, where desired, of pressures much higher than those which are at present considered practical. Further advantages reside in the provision of a novel apparatus according to which a definite pressing cycle can be carried out and the method practiced with absolute uniformity, both as to the time and the pressure at every stage in the cycle, the apparatus being largely automatic and being flexible to permit alteration of the cycle as may be required for the particular material being pressed and the particular article being formed.

While I have described in detail a pressing cycle in which there is an initial compacting stroke followed by a release of air and then a final pressing stroke, this cycle can be very advantageously altered in the case of certain clays or certain refractory compositions. For instance, I have found that with some clays it is very desirable to use two or more preliminary compacting stages, each reaching a higher pressure than the preceding one. All of these preliminary pressing operations can be effected at relatively high speed, while the final pressing operation which reaches a pressure higher than any obtained in the preliminary stages of the cycle is applied.

As previously stated, I have described the present invention particularly with reference to the pressing of bricks merely for the purpose of convenience, and it is understood that the invention is not limited to the formation of any particular shape. Moreover, the expression "granular material" as used herein and as used in the appended claims is intended to include various moldable mixes of a ceramic or refractory nature or of like character and shall include both wet and dry mixes, although the invention finds its chief application to the pressing of the so-called "dry mixes."

It will be appreciated that the drawings are largely schematic and that I have specifically described some preferred devices for use in the system as a whole.

It will be understood, however, that this is by way of illustration and that various changes and modifications may be made in the various units of the apparatus within the contemplation of my invention and under the scope of the following claims.

I claim:

1. The method of molding ceramic mixes and the like which comprises introducing all of the material into a mold in a single charging operation, subjecting it to an initial compression, thereafter opening the mold and relieving the pressure and allowing entrapped air to escape from the initially compressed mix, and then subjecting the material in the mold to a further pressing operation.

2. The method of pressing granular mixes and the like which comprises introducing the material into a mold in a single charging operation, subjecting all of it as a single mass to an initial pressing operation until it has been compressed to a point approximating its ultimate dimensions, relieving the pressure and allowing entrapped air to escape from the molded mass, and then subjecting the material in the mold to a further pressing operation, the second pressing operation being at pressures higher than the first pressing operation.

3. The method of pressing granular mixes in a press which comprises placing the material in a mold in the press, operating the press to effect an initial pressing operation, and effecting the major reduction of volume of the mix in such initial pressing operation, thereafter opening the mold to relieve entrapped air, again applying pressure to the press to a point equal to the maximum pressure reached on the initial pressing stage, and thereafter applying a gradually increasing pressure to the press until a desired maximum pressure has been reached.

4. Apparatus for the molding of granular mixes and the like comprising a fluid pressure operated press having a cylinder and a ram, a source of fluid pressure for operating the press, and means responsive to the actuation of the press and to the fluid pressure in the press cylinder interposed between the press and source of fluid pressure for initially operating the press on a pressure stroke, retracting the ram and then applying increased pressure thereto.

5. Apparatus for molding granular mixes and the like comprising a press having a cylinder and a plunger, a fluid pressure supply line, a normally open pressure closed valve in said line responsive to pressure on the cylinder side of the line for closing said valve at a predetermined maximum, a normally closed pressure operated valve in said line connected in parallel with said first valve and responsive to pressure on the cylinder side of the line for opening at a predetermined minimum, and means operative for relieving pressure on the cylinder side of the line.

6. Apparatus for molding granular mixes and the like comprising a press having a cylinder and a plunger, a fluid pressure supply line, a normally open pressure closed valve in said line responsive to pressure on the cylinder side of the line for closing said valve at a predetermined maximum, a normally closed pressure operated valve in said line connected in parallel with said first valve and responsive to pressure on the cylinder side of the line for opening at a predetermined minimum, and means operable for relieving pressure on the cylinder side of the line, said second valve being of the type which gradually opens from the closed to the fully opened position.

7. Apparatus for the pressing of granular mixes and the like comprising a press having a cylinder and a plunger and having a mold, a fluid pressure supply line connected to opposite ends of the cylinder through a fourway valve, a valve in the fluid supply line between the pressure and the cylinder and the four-way valve having means for holding it open and pressure responsive means for closing it, said pressure responsive means communicating with the system on the outlet side of said valve, a second valve connected in parallel with said last mentioned valve having means for normally closing it and having a fluid pressure responsive means for opening it, said fluid pressure responsive means communicating with the system on the outlet side of said valve, and means through which fluid pressure in the pressure end of the cylinder may be relieved.

8. Apparatus for the pressing of granular mixes and the like comprising a press having a cylinder and a plunger and having a mold, a fluid pressure supply line connected to opposite ends of the cylinder through a fourway valve, a valve in the fluid supply line between the pressure and the cylinder and the four-way valve having means for holding it open and pressure responsive means for closing it, said pressure responsive means communicating with the system on the outlet side of said valve, a second valve connected in parallel with said last mentioned valve having means for normally closing it and having a fluid pressure responsive means for opening it, said fluid pressure responsive means communicating with the system on the outlet side of said valve, and means through which fluid pressure in the pressure end of the cylinder may be relieved, said means including a pipe around the said last two valves and having a check valve therein which will permit the flow of fluid away from the pressure end of the cylinder only.

9. The combination with a fluid pressure press for the molding of granular mixes and the like, means for operating the press in accordance with a predetermined cycle, comprising a fluid supply line to the pressure end of the press, a valve in the fluid supply line which is open until a predetermined pressure in the system is reached, a second valve in the fluid supply line in parallel with the first valve which opens just before a pressure sufficient to close the first valve is reached, and a main control valve for the press operatively interposed in the fluid pressure line in advance of said first two valves.

10. Apparatus for molding granular mixes and the like comprising a fluid pressure actuated press having a cylinder and a plunger and a control system therefor including a fluid pressure supply line, a main control valve in said line, and a pair of auxiliary valves connected in parallel in said line between the main control valve and the press, one of said auxiliary valves being adapted to remain open until a predetermined pressure in the system is reached, the other of said valves being adapted to remain closed until just before the pressure in the system is sufficient to effect the closing of the first valve, said system including means by which pressure in the system may be relieved at desired intervals in the operation of the press.

11. Apparatus for molding granular mixes and the like comprising a fluid pressure actuated press having a cylinder and a plunger and a control system therefor including a fluid pressure supply line, a main control valve in said line, a pair of auxiliary valves connected in parallel in said line between the main control valve and the press, one of said auxiliary valves being adapted to remain open until a predetermined pressure in the system is reached, the other of said valves being adapted to remain closed until just before the pressure in the system is sufficient to effect the closing of the first valve, said system including means by which pressure in the system may be relieved at desired intervals in the operation of the press, said main control valve having electromagnetically operated means for moving it from a normal position to a plunger operating position and having other means for returning it to normal position upon deenergization of said electromagnetic means, and a circuit for said electromagnetic switch operating means having a closed position and an open position, and means responsive to fluid pressure in the system for operating the switch to open position when a predetermined pressure in the system has been reached.

12. Apparatus for molding granular mixes and the like comprising a fluid pressure actuated press having a cylinder and a plunger and a control system therefor including a fluid pressure supply line, a main control valve in said line, a pair of auxiliary valves connected in parallel in said line between the main control valve and the press, one of said auxiliary valves being adapted to remain open until a predetermined pressure in the system is reached, the other of said valves being adapted to remain closed until just before the pressure in the system is sufficient to effect the closing of the first valve, said system including means by which pressure in the system may be relieved at desired intervals in the operation of the press, said main control valve having electromagnetically operated means for moving it from a normal position to a plunger operating position and having other means for returning it to normal position upon deenergization of said electromagnetic means, a circuit for said electromagnetic switch operating means having a closed position and an open position, means responsive to fluid pressure in the system for operating the switch to open position when a predetermined pressure in the system has been reached, and a second switch in parallel with said first switch for re-establishing the circuit when said first switch has been opened.

13. Apparatus for molding granular mixes and the like comprising a fluid pressure actuated press having a cylinder and a plunger and a control system therefor including a fluid pressure supply line, a main control valve in said line, a pair of auxiliary valves connected in parallel in said line between the main control valve and the press, one of said auxiliary valves being adapted to remain open until a predetermined pressure in the system is reached, the other of said valves being adapted to remain closed until just before the pressure in the system is sufficient to effect the closing of the first valve, said system including means by which pressure in the system may be relieved at desired intervals in the operation of the press, said main control valve having electromagnetically operated means for moving it from a normal position to a plunger operating position and having other means for returning it to normal position upon deenergization of said electromagnetic means, a circuit for said electromagnetic switch operating means having a closed position and an open position, means responsive to fluid pressure in the system for operating the switch to open position when a predetermined pressure in the system has been reached, a second switch in parallel with said first switch for re-establishing the circuit when said first switch has been opened, and means on the press plunger for operating the said second switch to closed position upon a retracting movement of the press plunger.

14. Apparatus for molding granular mixes and the like comprising a fluid pressure actuated press having a cylinder and a plunger and a control system therefor including a fluid pressure supply line, a main control valve in said line, a pair of auxiliary valves connected in parallel in said line between the main control valve and the press, one of said auxiliary valves being adapted to remain open until a predetermined pressure in the system is reached, the other of said valves being adapted to remain closed until just before the pressure in the system is sufficient to effect the closing of the first valve, said system including means by which pressure in the system may be relieved at desired intervals in the operation of the press, said main control valve having electromagnetically operated means for moving it from a normal position to a plunger operating position and having other means for returning it to normal position upon deenergization of said electromagnetic means, a circuit for said electromagnetic switch operating means having a closed position and an open position, means responsive to fluid pressure in the system for operating the switch to open position when a predetermined pressure in the system has been reached, a second switch in parallel with said first switch for re-establishing the circuit when said first switch has been opened, and means on the press plunger for operating the said second switch to closed position upon a retracting movement of the press plunger, said means comprising a finger connected with the press plunger arranged to ride past the switch on the pressing stroke of the plunger and engage the switch on the retracting movement of the plunger.

15. The combination with a block press for the compacting of granular mixes and like materials, of a fluid pressure supply line, and means in said line for initially effecting rapid operation of the pressing plunger, then operating the plunger rapidly again to the point to which it was moved on its initial stroke and reversing it, and thereafter gradually increasing the pressure to a predetermined maximum.

16. The combination with a press for the molding of granular mixes and like materials, of a fluid pressure supply line and means in the line partially responsive to pressure in the line and partially responsive to the movement of the press for operating the press in a cycle in which there is an initial rapid pressing stroke followed by a retracting operation of the press, and then a second pressing stroke in the same pressing cycle to the maximum compression reached on the first pressing stroke followed by a gradual increase in the pressure above the maximum of the first stroke to the maximum reached in the pressing operation.

17. The combination with a press for the molding of granular mixes and like materials, of a fluid pressure supply line and means in the line partially responsive to pressure in the line and partially responsive to the movement of the press for operating the press in a cycle in which there is an initial rapid pressing stroke followed by a retracting operation of the press, and then a second pressing stroke in the same pressing cycle to the maximum compression reached on the first pressing stroke followed by a gradual increase in the pressure above the maximum of the first stroke to the maximum reached in the pressing operation, and selectively operable means for manually adjusting the rates of movement and the time of the pressing cycle.

18. The method of operating a pressing plunger in the compacting of granular mixes and the like, which comprises initially moving the plunger at a relatively rapid rate in the initial pressing stroke, thereafter retracting the plunger, then returning the plunger to the position reached on the first stroke, and thereafter applying gradually increasing pressure beyond the maximum reached on the initial stroke.

19. A press system for pressing granular mixes and the like comprising a press having a plunger, a cylinder and a mold, means for effecting an initial pressing stroke of the plunger to effect a predetermined minimum pressure and for effecting withdrawal of the plunger after such initial stroke, and means operable upon withdrawal of the plunger for again operating it on a pressing stroke to a pressure greater than the initial stroke.

20. A press system for the compacting of granular and similar mixes comprising a press having a mold, a cylinder, a plunger reciprocable in the cylinder, a fluid pressure supply line having a branch leading to one end of the cylinder for retracting the plunger, a second branch leading to the other end of the cylinder for extending the plunger, a main control valve for directing the flow of fluid through said branches, and means in said second branch for regulating the operation of the plunger comprising two valves connected in parallel in said branch, one of which is normally open and which closes when a predetermined pressure is reached in the system at the outlet side thereof, the other being arranged to open just in advance of the closing of the first.

21. A press system for the compacting of granular and similar mixes comprising a press having a mold, a cylinder, a plunger reciprocable in the cylinder, a fluid pressure supply line having a branch leading to one end of the cylinder for retracting the plunger, a second branch leading to the other end of the cylinder for extending the plunger, a main control valve for directing the flow of fluid through said branches, means in said second branch for regulating the operation of the plunger comprising two valves connected in parallel in said branch, one of which is normally open and which closes when a predetermined pressure is reached in the system at the outlet side thereof, the other being arranged to open just in advance of the closing of the first, means for reversing the main control valve on the first closing only of the first of said two valves in a given pressing cycle, and means for again reversing the main control valve upon a predetermined retracting movement of the plunger to again cause the plunger to be extended to complete the pressing cycle.

22. A press system for pressing granular mixes and the like comprising a press having a plunger, a cylinder and a mold, means for effecting an initial pressing stroke of the plunger to effect a predetermined minimum pressure and for effecting withdrawal of the plunger after such initial stroke, means operable upon withdrawal of the plunger for again operating it on a pressing stroke to a pressure greater than the initial stroke, and selectively operable means for varying the maximum pressure applied on the initial stroke and other selectively operable means for varying the pressure of the succeeding stroke.

23. The method of molding ceramic mixes and the like which comprises introducing the mix into the mold, subjecting it to a plurality of compacting stages in a press, releasing the entrapped air from the mold between the successive compacting steps, and finally subjecting the material in a mold to a further pressing operation at a pressure higher than the pressure applied in any of the compacting steps and by means of a pressure applied more gradually than in the compacting steps.

24. The method of operating a pressing plunger in the compacting of granular mixes and the like, comprising the steps of actuating the plunger on a plurality of initial compacting strokes at a relatively rapid rate and at progressively higher pressures, withdrawing the plunger from the forming mold sufficiently to permit the escape of entrapped air between the successive compacting stages, and thereafter applying a gradually increasing pressure beyond the maximum reached during any of the preliminary compacting strokes.

25. The method of molding a ceramic or like mix which comprises subjecting a mass of the mix in a mold to pressure until the mass has been reduced to approximately its ultimate shape and size, then rapidly relieving the pressure to effect a sudden expansion of air entrapped and compressed within the mass of the mix and simultaneously cause individual particles within the mass to readjust themselves, and subsequently subjecting the mass to a final and greater compressing action than the first.

BENJAMIN LASSMAN.